(12) United States Patent
Incesu et al.

(10) Patent No.: US 12,320,705 B2
(45) Date of Patent: Jun. 3, 2025

(54) POLARIZATION IMAGING DEVICE AND METHOD FOR POLARIZATION IMAGING

(71) Applicant: Sony Group Corporation, Tokyo (JP)

(72) Inventors: Yalcin Incesu, Stuttgart (DE); Alexander Gatto, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 340 days.

(21) Appl. No.: 17/777,633

(22) PCT Filed: Nov. 26, 2020

(86) PCT No.: PCT/EP2020/083484
§ 371 (c)(1),
(2) Date: May 18, 2022

(87) PCT Pub. No.: WO2021/105271
PCT Pub. Date: Jun. 3, 2021

(65) Prior Publication Data
US 2023/0026636 A1    Jan. 26, 2023

(30) Foreign Application Priority Data
Nov. 27, 2019    (EP) ..................................... 19211809

(51) Int. Cl.
*G01J 4/04*    (2006.01)
*G02B 27/28*    (2006.01)

(52) U.S. Cl.
CPC .............. *G01J 4/04* (2013.01); *G02B 27/286* (2013.01)

(58) Field of Classification Search
CPC ................................ G01J 4/04; G02B 27/286
(Continued)

(56) References Cited

U.S. PATENT DOCUMENTS

2008/0002202 A1    1/2008  Hall et al.
2009/0226049 A1*   9/2009  Debevec ................. G06T 15/50
                                                            382/118
(Continued)

FOREIGN PATENT DOCUMENTS

WO    2019/094793 A1    5/2019

OTHER PUBLICATIONS

International Search Report and Written Opinion mailed on Feb. 24, 2021, received for PCT Application PCT/EP2020/083484, Filed on Nov. 26, 2020, 10 pages.
(Continued)

*Primary Examiner* — Sunghee Y Gray
(74) *Attorney, Agent, or Firm* — XSENSUS LLP (57) ABSTRACT

The present disclosure generally pertains to a polarization imaging portion having a plurality of imaging elements, wherein each imaging element is configured to convert light into an electric signal, the polarization imaging portion further including: a set of event sensors configured to detect an event being indicative of an intensity change of the light; a set of polarization filters; and a set of tunable polarizers configured to adjust a polarization of the light in response to an electric signal, wherein each polarization filter of the set of polarization filters is associated with a respective tunable polarizer of the set of tunable polarizers, thereby configuring a set of tunable polarization filters, such that the set of tunable polarization filters is associated with the set of event sensors.

11 Claims, 5 Drawing Sheets

(58) Field of Classification Search
USPC .......................................................... 356/364
See application file for complete search history.

(56) References Cited

U.S. PATENT DOCUMENTS

| | | |
|---|---|---|
| 2012/0169910 A1 | 7/2012 | Singh |
| 2016/0178823 A1 | 6/2016 | Gupta |
| 2017/0241774 A9 | 8/2017 | Brandli et al. |
| 2018/0107015 A1 | 4/2018 | Dümpelmann et al. |
| 2021/0208427 A1* | 7/2021 | Lee ...................... G02B 5/3025 |

OTHER PUBLICATIONS

Wolff et al., "Liquid Crystal Polarization Camera", IEEE Transactions on Robotics and Automation, vol. 13, No. 2, Apr. 1997, pp. 195-203.

Winker et al., "Liquid Crystal Tunable Polarization Filter for Target Detection Applications", Proceedings vol. 6972, Polarization: Measurement, Analysis, and Remote Sensing VIII, SPIE Defense and Security Symposium, Mar. 31, 2008, 3 pages.

\* cited by examiner

POLARIZATION IMAGING DEVICE AND METHOD FOR POLARIZATION IMAGING

CROSS-REFERENCE TO RELATED APPLICATIONS

The present application is based on PCT filing PCT/EP2020/083484, filed Nov. 26, 2020, which claims priority to EP 19211809.9, filed Nov. 27, 2019, the entire contents of each are incorporated herein by reference.

TECHNICAL FIELD

The present disclosure generally pertains to a polarization imaging portion and a polarization imaging method.

TECHNICAL BACKGROUND

Generally, polarization imaging is a known technique, for example in a laboratory, but also in commercially available camera devices, e.g. for filtering out reflections of images from non-metallic surfaces, and the like.

Moreover, in the technical field of machine vision, polarization imaging may be utilized for characterizing a surface, retrieving a surface normal, performing material classification, detecting mechanical stress in a material, suppressing a spectral highlight, and the like.

Generally, two systems are known for acquiring a polarization image, which are firstly using a polarization sensor and secondly using an analyzer in front of a monochrome sensor.

Although there exist techniques for polarization imaging, it is generally desirable to provide a polarization imaging portion and a method for polarization imaging.

SUMMARY

According to a first aspect, the disclosure provides a polarization imaging portion comprising a plurality of imaging elements, wherein each imaging element is configured to convert light into an electric signal, the polarization imaging portion further comprising: a set of event sensors configured to detect an event being indicative of an intensity change of the light; a set of polarization filters; and a set of tunable polarizers configured to adjust a polarization of the light in response to an electric signal, wherein each polarization filter of the set of polarization filters is associated with a respective tunable polarizer of the set of tunable polarizers, thereby configuring a set of tunable polarization filters, such that the set of tunable polarization filters is associated with the set of event sensors.

According to a second aspect, the disclosure provides a method for polarization imaging for a polarization imaging portion comprising a plurality of imaging elements, wherein each imaging element is configured to convert light into an electric signal, the polarization imaging portion further comprising a set of event sensors configured to detect an event being indicative of an intensity change of the light; a set of polarization filters; and a set of tunable polarizers configured to adjust a polarization of the light in response to an electric signal, wherein each polarization filter of the set of polarization filters is associated with a respective tunable polarizer of the set of tunable polarizers, thereby configuring a set of tunable polarization filters, such that the set of tunable polarization filters is associated with the set of event sensors, the method comprising: tuning the set of tunable polarizers by applying an electric signal to the set of tunable polarizers.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 7:
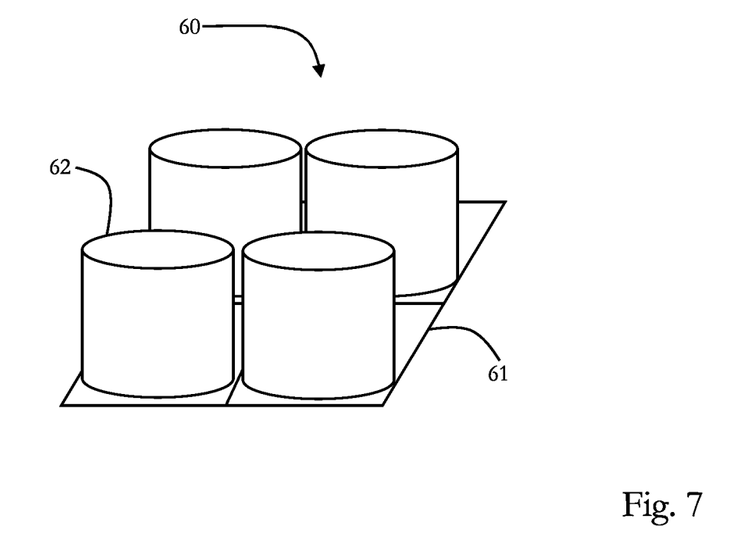
FIG. 7 illustrates a polarization imaging portion according to the present disclosure.

Before a detailed description of the embodiments under reference of FIG. 7 is given, general explanations are made.

As mentioned in the outset, methods for polarization imaging are known, such as a polarization sensor or an analyzer in front of a monochrome sensor.

However, it has been recognized that a polarization sensor may have an insufficient resolution and an analyzer may acquire sequential images in different polarization angles time-inefficiently.

A known system may be a rotatable polarization filter, which may be put on an objective attached to a monochrome camera. The polarization filter may be rotated manually or by a motorized rotation stage, for example.

With this system, a sufficient spatial resolution may be achieved since for each pixel of the monochrome camera. However, in order to capture a maximum of polarization information, a sequential imaging in different polarization angles of the rotatable polarization filter may be time consuming since each angle may have to be adjusted after the other, thereby being limited to a speed (and/or a step length) of the motorized rotation stage.

In such a system, a sequence of polarization images may be acquired in order to obtain sufficient polarization information. Therefore, a starting orientation of the rotatable polarization filter may be adjusted for acquiring a first image and for each further acquisition the rotatable polarization filter is rotated by a predetermined angle until the starting orientation is reached again, thereby having a plurality of polarization images.

Based on the plurality of polarization images, a plot of a measured intensity versus the adjusted orientation is generated, wherein a graph of the intensity is typically above a baseline deriving from unpolarized light included in the overall measured light.

Another known system may include a monochrome camera with (static) polarization filters on a pixel level, wherein four different filter orientations (e.g. zero degrees, forty-five degrees, ninety degrees, and one hundred and thirty five degrees) may be provided as a two by two square over four pixels.

With such a system, an imaging may be performed time-efficiently. However, since only four polarization angles are implemented, a loss of polarization information cannot be excluded. Moreover, for each pixel, there may only be one polarization information directly acquired and it may be concluded to other polarization information of this respective pixel by a demosaicking algorithm, for example, thereby resulting in a loss a spatial resolution.

Hence, in some embodiments, it is desirable to provide a time-efficient polarization imaging portion with a sufficient spatial resolution and/or intensity resolution.

Therefore, some embodiments pertain to a polarization imaging portion including a plurality of imaging elements being arranged in an array, wherein each imaging element is configured to convert light into an electric signal, the polarization imaging portion further including: a set of event sensors configured to detect an event being indicative of an intensity change of the light; a set of polarization filters; and a set of tunable polarizers configured to adjust a polarization of the light in response to an electric signal, wherein each polarization filter of the set of polarization filters is associated with a respective tunable polarizer of the set of tunable polarizers, thereby configuring a set of tunable polarization filters, such that the set of tunable polarization filters is associated with a set of event sensors.

An imaging element may be based on a known imaging technology, such as CMOS (Complementary Metal Oxide Semiconductor), CCD (Charge Coupled Device), SPAD (Single Photon Avalanche Diode), CAPD (Current Assisted Photonic Demodulator), and the like.

The plurality (i.e. at least two) of imaging elements may be arranged in an array, such that they may be driven, controlled, modulated, and the like, at the same time or at different times, and/or such that each imaging element may contribute, as a smallest imaging unit, to an image, which is taken of a scene, an object, and the like. In this context, an imaging element may also be referred to as a pixel.

Each imaging element may be configured to convert light into an electric signal, as it is generally known within the field of the above-mentioned technologies (CMOS, CCD, etc.), without limiting the present disclosure to the above-mentioned technologies, as it may be applied to any imaging technology, in which a light signal may be converted into an electric signal.

The polarization imaging portion may further include a set (i.e. at least one) of polarization filters.

As it is generally known, a polarization filter may absorb a fraction of polarized light, based on dichroism, and the like.

According to the present disclosure, each of the set of polarization filters may be of a same or identical type, i.e. may filter light of a same predetermined polarization (e.g. linear, circular, perpendicular, parallel, and the like) or at least one polarization filter may filter light of a predetermined polarization being different from a filtering of at least one further polarization filter of the set of polarization filters. In general, each of the polarization filters of the set of polarization filters may be configured to filter different polarizations, e.g. depending on an angle of the polarized light, and the like.

Moreover, the polarization imaging portion may include a set (i.e. at least one) of tunable polarizers.

The set of tunable polarizers and the set of polarization filters may correspond in a number, e.g. that one tunable polarizer of the set of tunable polarizers may be associated with a corresponding polarization filter of the set of polarization filters, without limiting the present disclosure in that regard, since the number of tunable polarizers and the number of polarization filters may as well be different.

Each of the tunable polarizers of the set of tunable polarizers may be configured to adjust a polarization of the light in response to an electric signal.

For example, a tunable polarizer according to the present disclosure may rotate a polarization (e.g. of a linearly polarized component or any other polarized component) of the light depending on a current flowing in the tunable polarizer, depending on a voltage being applied to the tunable polarizer, and the like, whereas an unpolarized component may hardly to not be affected by passing through the tunable polarizer.

In some embodiments, the tunable polarizer may include (and may be formed of) a liquid crystal, such that a polarization (or a rotation of the polarization) of the light may depend on a crystal structure of the liquid crystal. Moreover, the crystal structure (or its characteristic) may depend on the electric signal applied to the tunable polarizer, such that the polarization of the light is adjusted in response to the electric signal.

However, the present disclosure is not limited to the case of the tunable polarizer being a liquid crystal and any tunable polarizer may be envisaged, e.g. a nanostructured surface, which may be coated with a magneto-viscous liquid, and, thus, may be tunable by an application of a magnetic and/or electric field, and the like.

In some embodiments, the number of polarization filters of the set of polarization filters is the same as the number of tunable polarizers of the set of tunable polarizers, such that each polarization filter may be associated with a respective tunable polarizer.

For example, each tunable polarizer and each corresponding polarization filter may be stacked, laminated, and the like, such that they configure a set (i.e. at least one) of tunable polarization filters.

Each of the tunable polarization filters may be associated with the set of event sensors.

For example, a tunable polarization filter may be provided for more than one event sensor, whereas another tunable polarization filter may be provided for exactly one event sensor.

However, in some embodiments, each tunable polarization filter may be associated with exactly one event sensor, whereas, in other embodiments, one tunable polarization filter may be associated with all of the set of event sensors.

The tunable polarization filters may be associated with the set of event sensors, for example, by stacking, laminating, an electric connection, which may be a direct connection or an indirect connection (e.g. an imaging element (one or more) or any other electronic component may be provided between the set of event sensors and the tunable polarization filters), and the like.

With a configuration of the polarization imaging portion according to the present disclosure, a polarization image may be acquired, wherein each of the pixels, event sensors and/or each of the set of tunable polarizers may be driven separately (i.e. asynchronous) or synchronously, and wherein a different polarization may be applied to each of the tunable polarizers (wherein in other embodiments tunable polarizers may also be grouped, wherein the groups may be driven separately).

Moreover, it may be envisaged to not associate every event sensor with a tunable polarization filter, such that a polarization imaging portion according to the present disclosure may also be configured to acquire unfiltered light on such event sensors.

The event sensor may include a dynamic vision sensor recording a change of intensity over a recording time, and the like.

The event sensor may include a monochrome sensor (i.e. may detect one color) or a polychrome sensor (i.e. may detect multiple colors), such as a Bayer sensor, and the like, as it is generally known.

The event sensor may include a temporal resolution in a microsecond range, wherein an event may be triggered by an adjustable threshold, which may depend on the light intensity.

The event sensor may trigger a positive event (e.g. plus one) (e.g. when the light intensity increases) and a negative event (e.g. minus one) (e.g. when the light intensity decreases) or no event (e.g. zero), if no increase or decrease of the intensity is determined after a predetermined amount of time.

Hence, a sequence or a series of events may be detected, thereby indicating a change of intensity over time.

In some embodiments, the set of event sensors is associated with the plurality of imaging elements.

Typically, an event sensor of the set of event sensors may be provided to each imaging element of the plurality of imaging elements, such that the set of event sensors may have a same number as the set of imaging elements of the plurality of imaging elements, without limiting the present disclosure in that regard as the respective numbers may differ, as well.

An event sensor may be associated with an imaging element in that it may be electrically connected to or included in the imaging element, such that the event sensor may be configured to sense an electric signal being generated in response to a photoelectric conversion in the imaging element and thereby perform an event sensing (as described below) or such that the event sensor may be configured to generate such a signal by itself and evaluate the signal, as well.

As discussed, one event sensor may be associated with one imaging element. In such as case, it may not be required that the event sensors are synchronized, and, thus, each event of different imaging elements may be detected at an arbitrary time.

However, the present disclosure is not limited to such a case, as one event sensor may be associated with more than one imaging elements and vice versa. Moreover, any combination of an association of event sensors and imaging elements may be envisaged. For example, one of the set of event sensors may be associated with three imaging elements, whereas two other of the set of event sensors may each be associated with four imaging elements, and the like.

Thereby, by acquiring a polarization image, there is no need for the plurality of imaging elements to be driven synchronously, such that an event from a first imaging element may be generated at a different time than an event from a second imaging element.

In some embodiments, the polarization imaging portion further includes reconstruction circuitry configured to reconstruct the intensity of the light based on the detected event.

For describing an underlying reconstruction process of the reconstruction circuitry, general explanations concerning the tunable polarization filter and the event sensor are given in the following, which are described under reference of FIGS. 1 to 6.

Figure 1:
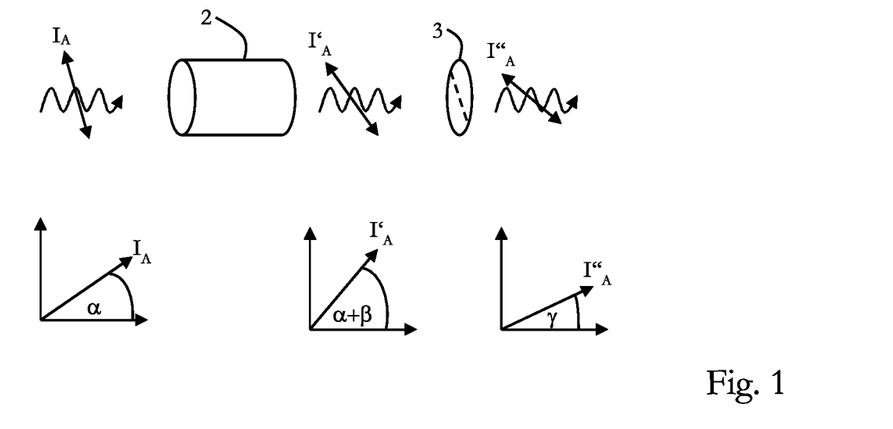
FIG. 1 depicts a schematic illustration of a tunable polarization filter.

FIG. 1 depicts a schematic illustration of a tunable polarization filter 1 including a tunable polarizer 2 and a static polarization filter 3 polarizing in a predetermined manner.

For illustrational purposes only, the tunable polarizer 2 and the static polarization filter 3 are depicted as being not connected. However, as discussed above, they may be stacked, laminated, connected, and the like, as well. In some embodiments, they are such aligned that a principal symmetry axis of both entities coincides.

Light of an intensity $I_A$ and of a polarization $\alpha$ may pass the tunable polarizer 2, thereby having a change in intensity to $I'_A$ and in polarization to $\alpha+\beta$ since the polarization may be rotated due to the tunable polarizer 2. Moreover, by passing the static polarization filter 3, the light has a change in intensity to $I''_A$ and in polarization to $\gamma$ which may correspond to the polarization angle of the static polarization filter 3.

Furthermore, the intensity $I''_A$ of the transmitted light (i.e. the light after the static polarization filter 3) may depend on the polarization of the tunable polarizer 2 and of the polarization angle of the static polarization filter 3.

Generally, it may be desirable to determine the intensity $I_A$ and the polarization angle $\alpha$. However, the intensity $I'_A$ and the polarization angle $\gamma$ may be measured in a polarization imaging portion according to the present disclosure.

Thus, the intensity $I_A$ and the polarization $\alpha$ may be reconstructed from the measured intensity $I''_A$ and the polarization $\gamma$.

The intensity $I''_A$ may be determined by Malus' law, which may describe an intensity of light after the light passes a static polarization filter. $I''_A$ may be expressed with formula (1):

$$I''_A = I'_A * \cos^2(\alpha+\beta-\gamma) \tag{1}$$

It should be noted that the polarization angle $\beta$ may generally depend on the electric signal (e.g. a voltage) applied to the tunable polarizer.

It may be assumed that the intensity $I_A$ and $I'_A$ are correlated linearly, as expressed with formula (2):

$$I'_A = I_A * \sigma \tag{2}$$

In formula 2, $\sigma$ may represent a proportionality factor, i.e. a constant.

Figure 2:
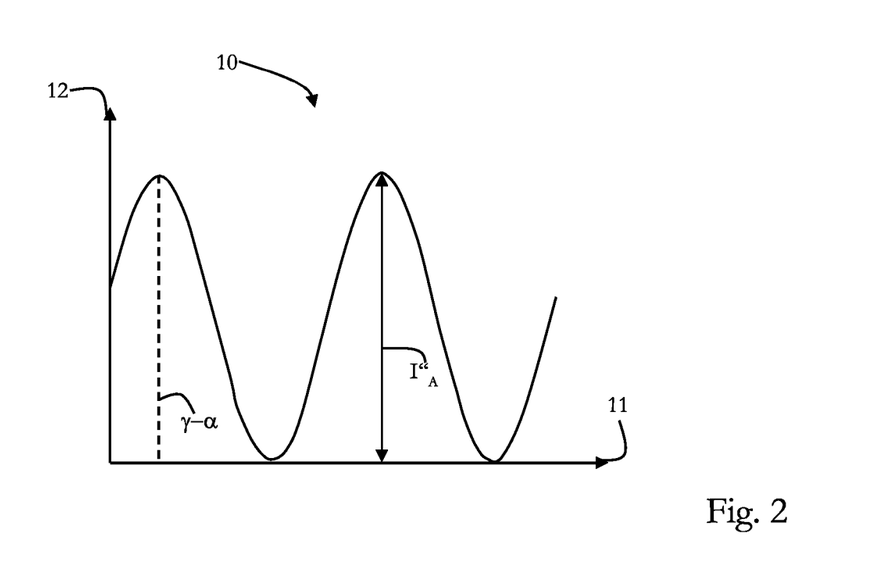
FIG. 2 depicts an intensity distribution of completely polarized light.

Assuming the light is completely polarized, an intensity distribution may be represented with a coordinate system 10 of FIG. 2, in which, on an abscissa 11, the polarization $\beta$, and, on an ordinate 12, the intensity $I''_A$ is depicted.

The polarization $\beta$ may be obtained due to a detection of a plurality of events representing a change of an intensity of light, which may be representative for a change of the polarization indicated by an applied control voltage. In other words, the polarization $\beta$ may be determined by a voltage sweep and a detection of events without limiting the present disclosure in that regard.

Moreover, the polarization $\gamma-\alpha$ may be derived from the coordinate system 10.

However, the present disclosure may not be limited to the case of an overall polarization of measured light.

Hence, assuming that the intensity $I_A$ may include an intensity of polarized light and of unpolarized light, formula (3) may be derived:

$$I_A = I_{pol} + I_{unp} \tag{3}$$

In formula (3), $I_{pol}$ may represent polarized light and $I_{unp}$ may represent unpolarized light.

However, by passing the tunable polarizer 2, the intensities $I_{pol}$ and $I_{unp}$ may be attenuated. Moreover, by passing the static polarization filter 3, the intensity $I_A$ may be assumed to be (roughly) halved and the unpolarized light $I_{unp}$ may be polarized, as depicted in FIG. 3.

Figure 3:
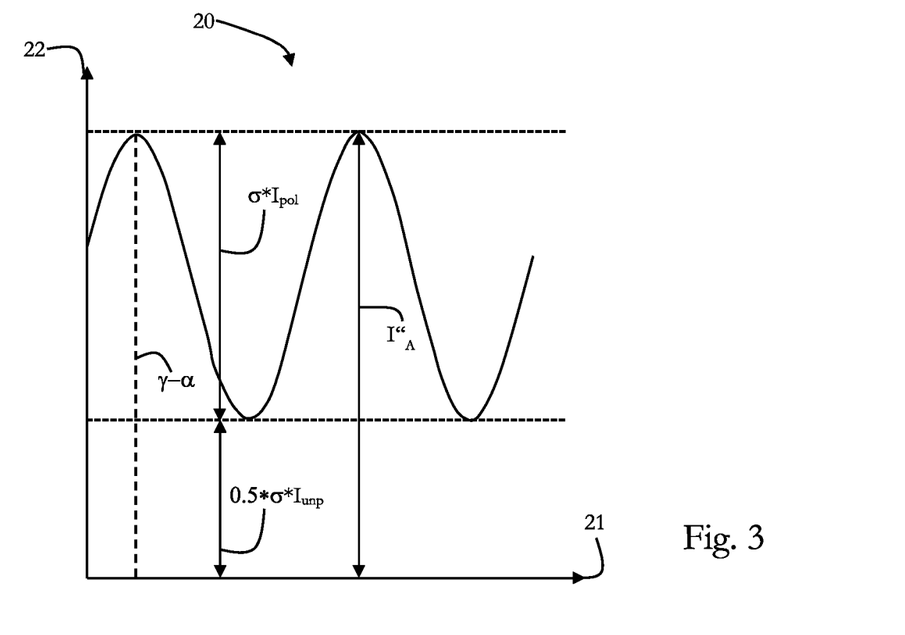
FIG. 3 depicts a coordinate system for a light intensity of partly polarized and partly unpolarized light after passing the tunable polarization filter.

FIG. 3 depicts a coordinate system 20 having, on an abscissa 21, the polarization angle β and, on an ordinate 22, the light intensity $I''_A$, similar to the coordinate system 10 of FIG. 2.

Moreover, as can be taken from FIG. 3, the intensity $I''_A$ is split into $\sigma^* I_{pol}$ and $0.5 * \sigma^* I_{unp}$, which may be derived by inserting formula (3) into formula (2) and applying the assumption of halving of the unpolarized intensity.

Thereby, formula (4) may emerge:

$$I'_A = \sigma^* I_{pol} + 0.5 * \sigma^* I_{unp} \quad (4)$$

Inserting formula (4) into formula (1), formula (5) as follows may be derived:

$$I''_A = \sigma^* (I_{pol} * \cos^2(\alpha + \beta - \gamma) + 0.5 * I_{unp}) \quad (5)$$

The quantities $I''_A$, $I_{pol}$, and γ may be measured in a calibration process, and the like. The quantities σ and β may be determined in a calibration process, which may only be carried out one time before a start of an operation. In particular, since β may depend on an applied voltage, a polarization property of the tunable polarizer may be determined according to the applied voltage.

Moreover, as discussed above, according to the present disclosure, the intensity may not be directly measured, but a change of intensity over time may be measured by applying an event sensor. Hence, the quantity $I_{unp}$ may be considered as a constant, which may be derived in an initial value problem.

An initial value (or starting value) may be determined by providing a (mechanical or electric, also global electrical) shutter, which may be opened before an electric signal is changed or applied to the tunable polarization filter, whereby a series of events may be acquired. By multiplying a number of the events with the predetermined threshold of intensity the initial value may be determined.

For the reconstruction of the intensity, as discussed, events may be detected, wherein an event may be triggered when the measured intensity is above or below a predetermined threshold.

Thereby, a calibration of the system may be carried out (e.g. a negative value of an intensity change may be transformed to a positive value of an intensity).

The initial polarization α may be determined (e.g. computed) based on formula (5), since all remaining quantities may be assumed to be known.

Figure 4:
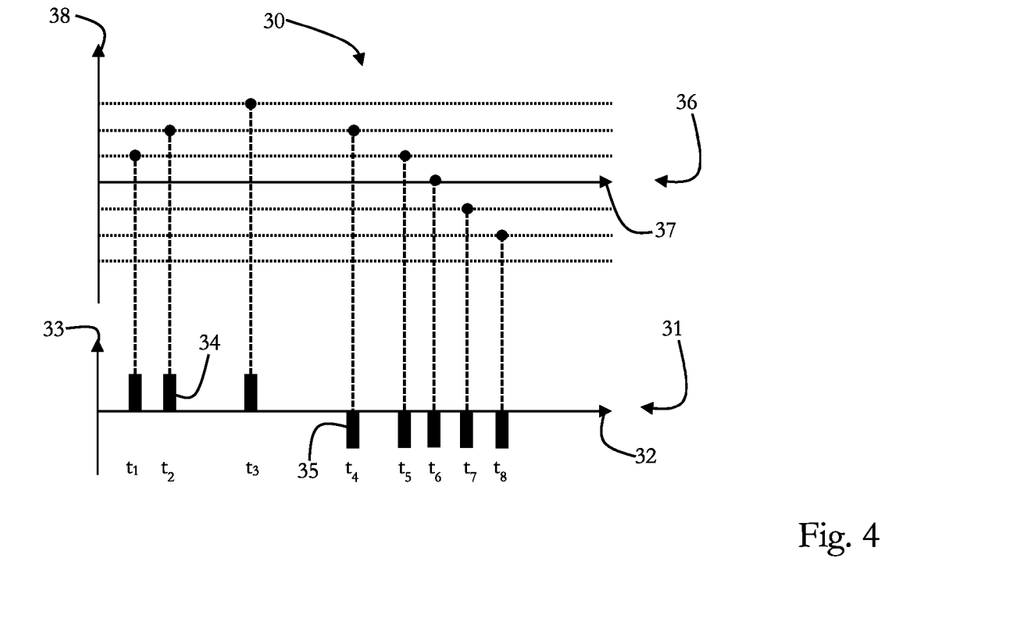
FIG. 4 depicts a schematic view of determining the intensity by detecting events.

FIG. 4 depicts a schematic view 30 of determining the intensity $I''_A$, by detecting events at detection points of time $t_1$ to $t_8$.

FIG. 4 includes a first diagram 31 in which on an abscissa 32 a time (including the detection points of time $t_1$ to $t_8$) is depicted and on an ordinate 33 a detected event is indicated with a positive peak 34, if a change of intensity is above a predetermined threshold larger compared to a previously determined intensity, and with a negative peak 35, if a change of intensity is above a predetermined threshold (which may be the same threshold or another threshold as the previously mentioned threshold) smaller compared to a previously determined intensity.

A positive peak may indicate an increase of a previously determined intensity by adding a predetermined value (in this embodiment one is added) to the previously determined intensity, as depicted in a second diagram 36 of FIG. 4. In the case of $t_1$, in which a positive peak is 34 is detected, no previously intensity is detected, and as an initial value zero is determined since it is assumed that no unpolarized light is included in the detected light. However, as discussed above, an initial intensity may be determined by solving an initial value problem.

In the second diagram 36, an abscissa 37 includes the polarization angle β and an ordinate 38 includes the intensity $I''_A$, which is determined based on the event sensing depicted in the diagram 31, as discussed above. The abscissa is placed on the zero-value of the intensity $I''_A$.

Since the polarization β may depend on the applied voltage, as discussed herein, and the voltage may be controlled depending on a time, the points of time $t_1$ to $t_8$ may be transformed into the polarization β.

Figure 5:
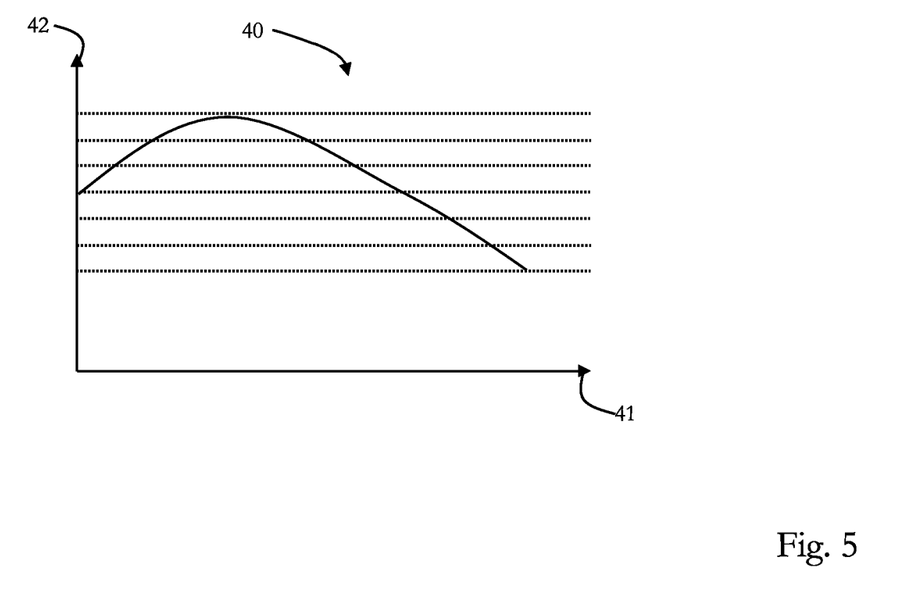
FIG. 5 depicts a coordinate system for a light intensity.

FIG. 5 depicts a coordinate system 40 including an abscissa 41 including a polarization β and an ordinate 42 including an intensity $I''_A$, wherein the abscissa is placed on the zero-value of the intensity $I''_A$, similar to the second diagram 36 of FIG. 4.

However, in this embodiment, the initial value is determined to be non-zero, since a portion of the detected light is determined to be unpolarized light. Moreover, in contrast to FIG. 4, a steady curve is determined from detected events by fitting derived detection points (similar to diagram 36 of FIG. 4) with a predetermined function, which is in this embodiment a sinusoidal function.

Figure 6:
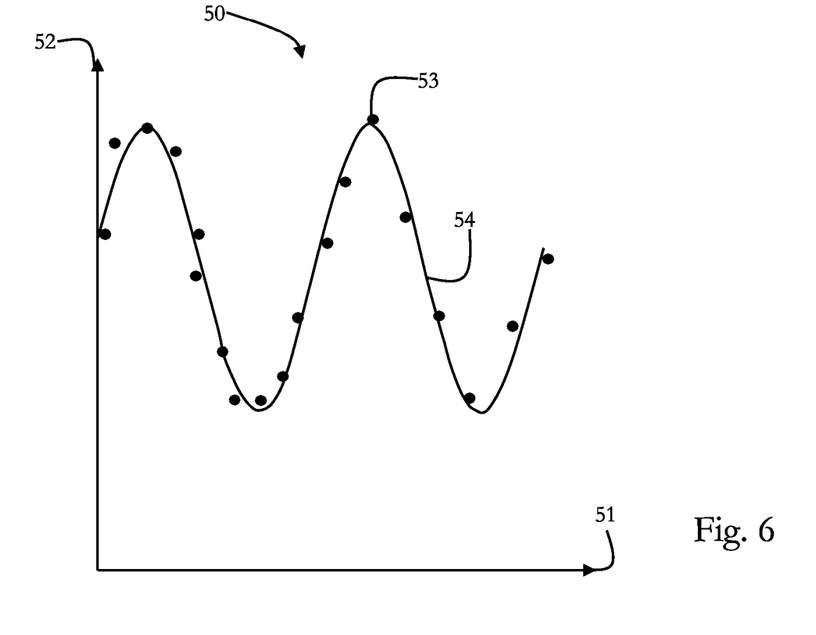
FIG. 6 depicts a coordinate system in which detected intensity points are reconstructed.

By performing a detection and a reconstruction according to the present disclosure, an influence of detection noise (e.g. Poisson noise of light's intensity, as it is generally known) may be suppressed, which is discussed with respect to FIG. 6.

Generally, noise may lead to a perturbation of the recorded events in one way that either an event may be recorded earlier or later than it actually happens or in a second way that a previously pure series of positive or negative events of a noiseless measurement may be corrupted by events of opposite type, for example, in a way that positive events are false detected as negative events and vice versa.

FIG. 6 depicts a coordinate system 50 including, on an abscissa 51, a polarization angle β and, on an ordinate 52, an intensity $I''_A$. Detected intensity points 53 are reconstructed, as discussed herein.

Compared to an analog measurement (e.g. with a photo diode, and the like), the detected intensity points are not based on a noisy signal, but based on a change of intensity, wherein the threshold for detecting the change of intensity may be chosen, such that it extends a noise of the signal, thereby excluding the noise.

Moreover, since a number of intensity points may be detected being large enough to perform a statistical analysis, it may be assumed that a mean of the detected intensity points (or a fit 54) may correspond to a noiseless signal.

In some embodiments, the reconstruction circuitry is further configured to detect a change of a light intensity being indicated by a change of a number of consecutively detected events, as discussed herein.

In some embodiments, the reconstructing is based on a coordinate transformation of a function being indicative of the light intensity, as discussed herein.

The coordinate transformation may include a transformation from the measurement time to the polarization angle, as discussed above, or a transformation from the intensity $I''_A$ to the intensity $I_A$ or a transformation according to any other formula of the formulas (1) to (5).

Generally, it should be noted that according to the present disclosure, compared to known polarization imaging systems, a sufficient spatial (e.g. four times higher than with known systems) and temporal resolution may be achieved in some embodiments.

In particular, a polarization imaging portion according to the present disclosure may be driven time-efficiently by adjusting the predetermined threshold of the event sensor's trigger, thereby determining an achievable intensity resolution, as well.

Moreover, by combining acquisition or measurements with different predetermined thresholds, a higher resolution may be achieved than with the respective single acquisitions.

Furthermore, a scene (e.g. an object which is imaged), which has a high dynamic range (e.g. a dynamic range above a predetermined threshold) may lead to a saturation of known polarization imaging systems, whereas, according to the present disclosure, in some embodiments, no saturation happens since a change of intensity is acquired and not the intensity itself.

In some embodiments, the polarization imaging portion further includes tuning circuitry configured to tune the set of tunable polarizers by applying an electric signal to the set of tunable polarizers.

As discussed herein, the electric signal may be a current and/or a voltage applied to at least one of the tunable polarizers, such that a structure/characteristic of the tunable polarizer may be changed in order to filter the polarized light.

Tuning may, in this context, include an adjustment, a changing, an alteration, and the like, of the electric signal for changing the filtering, rotation, and/or polarization properties of the tunable polarizer.

In some embodiments, the tuning circuitry is further configured to apply the electric signal for adjusting at least one first tunable polarizer of the set of tunable polarizers to have the polarization of the light differently from at least one second tunable polarizer of the set of tunable polarizers.

For example, each of the tunable polarizers may be configured to have different filtering properties, e.g. depending on an angle, such that a polarization image may be acquired time-efficiently.

In some embodiments, the tuning circuitry is further configured to apply the electric signal for adjusting each tunable polarizer of the set of tunable polarizers for having the same polarization of the light.

Thereby, a polarization image may be acquired resolution-efficiently.

In some embodiments, one tunable polarization filter is associated with one imaging element, as discussed herein.

In some embodiments, one tunable polarization filter is associated with at least two imaging elements, as discussed herein.

In some embodiments, the tunable polarizers of the set of tunable polarizers include a liquid crystal, as discussed herein (e.g. each of the tunable polarizers is formed with or based on a liquid crystal). The liquid crystal may include, for example, a twisted nematic crystal, and the like.

In some embodiments, the polarization filters of the set of polarization filters include a static polarization filter (e.g. each of the tunable polarizers is formed with or based on a static polarization filter).

The static polarization filter may be configured to filter the same type of polarized light without having dynamically adaptable filtering, rotation, and/or polarization properties, and the like, as it is generally known.

Some embodiments pertain to a method for polarization imaging for a polarization imaging portion comprising a plurality of imaging elements being arranged in an array, wherein each imaging element is configured to convert light into an electric signal, the polarization imaging portion further having a set of event sensors configured to detect an event being indicative of an intensity change of the light; a set of polarization filters; and a set of tunable polarizers configured to adjust a polarization of the light in response to an electric signal, wherein each polarization filter of the set of polarization filters is associated with a respective tunable polarizer of the set of tunable polarizers, thereby configuring a set of tunable polarization filters, such that the set of tunable polarization filters is associated with set of event sensors, the method including: tuning the set of tunable polarizers by applying an electric signal to the set of tunable polarizers, as discussed herein.

The method may be performed by any circuitry provided to or associated with a polarization imaging portion according to the present disclosure, such as tuning circuitry, reconstruction circuitry, and the like, whereas it should be noted that the respective circuitries may be realized by a processor (or multiple processors), e.g. a CPU (Central Processing Unit), a GPU (Graphic Processing Unit) an FPGA (Field Programmable Gate Array), or multiple and/or combinations of the named elements, without limiting the present disclosure in that regard, since the method may be carried out with any circuitry being programmable to carry out the method according to the present disclosure.

In some embodiments, the method further includes applying the electric signal for adjusting at least one first tunable polarizer of the set of tunable polarizers to have the polarization of the light differently from at least one second tunable polarizer of the set of tunable polarizers, as discussed herein. In some embodiments, the method further includes applying the electric signal for adjusting each tunable polarizer of the set of tunable polarizers to have the same polarization of the light, as discussed herein. In some embodiments, the method further includes detecting an event being indicative of an intensity of the light, as discussed herein. In some embodiments, the method further includes reconstructing the intensity of the light based on the detected event, as discussed herein. In some embodiments, a change of a light intensity is indicated by a change of a number of consecutively detected events, as discussed herein. In some embodiments, the reconstructing is based on a coordinate transformation of a function being indicative of the light intensity, as discussed herein. In some embodiments, the coordinate transformation is based on a partitioning of the light into a polarized part and an unpolarized part, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 7, there is illustrated a polarization imaging portion 60 according to the present disclosure.

The polarization imaging portion 60 includes four imaging elements 61, wherein onto each imaging element 61 a tunable polarization filter 62 is stacked, as discussed herein.

Generally, the present disclosure is not limited to the plurality of imaging elements being four. It could be any number equal to or larger than one. Moreover, as discussed herein, not every imaging element is necessarily associated with a tunable polarization filter, whereas one tunable polarization filter may be associated with a plurality of imaging elements, as exemplarily shown in FIG. 8.

Figure 8:
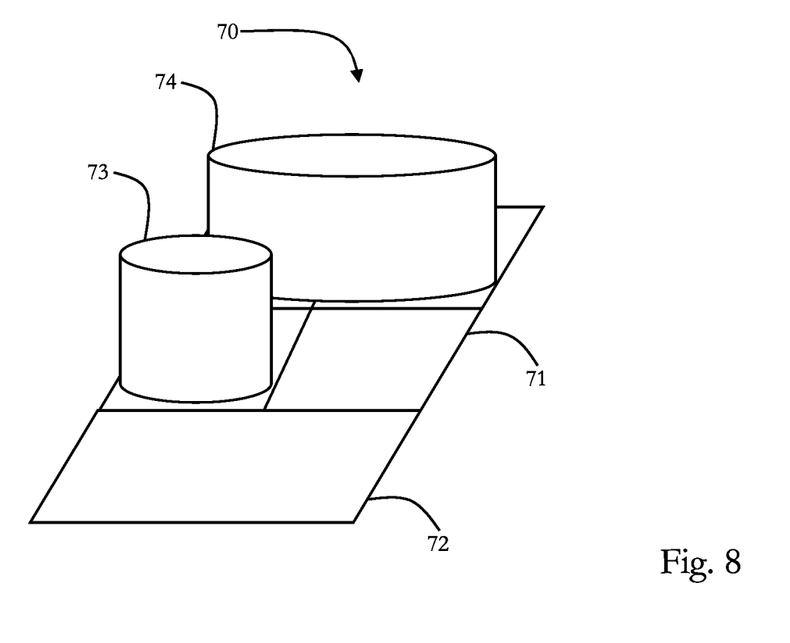
FIG. 8 illustrates a further embodiment of a polarization imaging portion according to the present disclosure.

FIG. 8 depicts a polarization imaging portion 70 including five imaging elements 72 of a first size and a further imaging element 72 of a second size. Moreover, one of the imaging elements 71 of the first size is associated with a tunable polarization filter 73 of a first size, and two further imaging elements 71 of the first size are associated with a tunable polarization filter 74 of a second size. The remaining imaging element 71 of the first size is not associated with a tunable polarization filter, such as the imaging element 72 of the second size.

Figure 9:
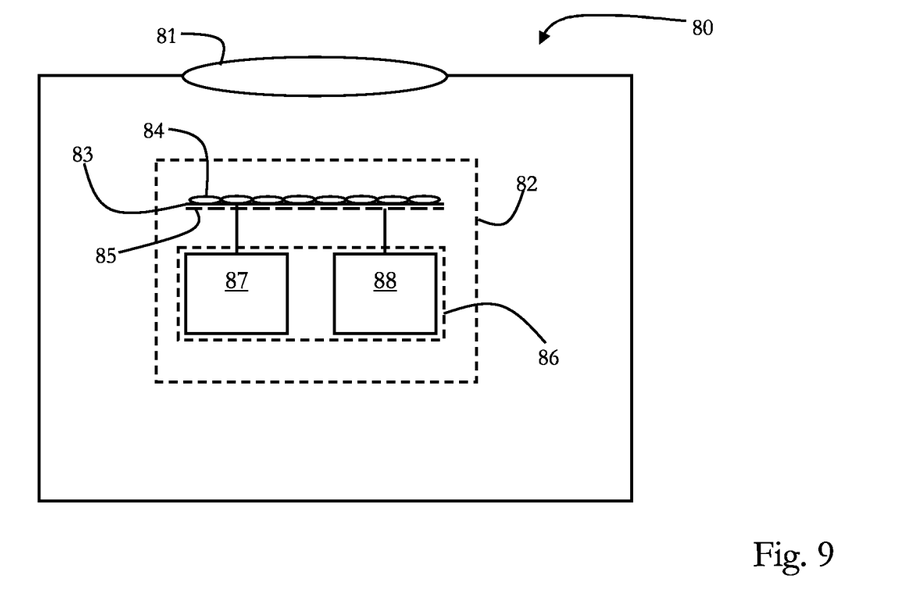
FIG. 9 illustrates, in a block diagram, a polarization imaging apparatus according to the present disclosure.

FIG. 9 illustrates, in a block diagram, a polarization imaging apparatus 80 according to the present disclosure.

The polarization imaging apparatus 80 includes an optical stack 81 configured to focus, deflect, reflect, and the like, light incident on the polarization imaging apparatus 80.

The light is directed, by the optical stack 81, onto a polarization imaging portion 82 according to the present disclosure.

The polarization imaging portion 82 includes a set of event sensors 85 being associated with a set of tunable polarization filters 84, as discussed herein. Moreover, the polarization imaging portion 82 includes a plurality of imaging elements 83 being arranged in an array, which are associated with the set of event sensors 85, as discussed herein.

The polarization imaging portion 82 further includes control circuitry 86 for tuning the tunable polarization filter and for reconstructing a signal, and, thus, the control circuitry 86 includes tuning circuitry 87, as discussed herein, and reconstruction circuitry 88, as discussed herein.

The tuning circuitry 87 applies an electric signal to each of the tunable polarization filters 84, whereas the reconstruction circuitry 88 reads out a signal from each of the event sensors 85 for reconstructing an intensity and a polarization, as discussed herein.

In this embodiment, the control circuitry 86 is designed as a CPU. However, the present disclosure is not limited to this case, as the timing circuitry 87 and the reconstruction circuitry 88 may be designed as single processors, and the like, in particular since the present disclosure is not limited to the case that the control circuitry 86 is included in a polarization imaging apparatus, such as in the polarization imaging apparatus 80, as it may be associated with an imaging element (or multiple imaging elements) being associated with a tunable polarization filter (or multiple tunable polarization filters) as an external system, and the like.

Figure 10:
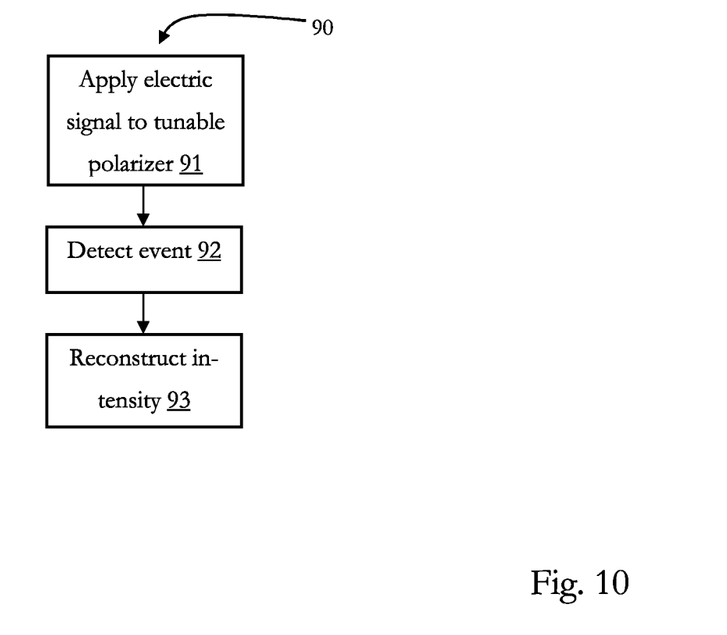
FIG. 10 shows a block diagram of a method for polarization imaging according to the present disclosure.

FIG. 10 shows, in a block diagram, a method for polarization imaging 90 according to the present disclosure.

In 91, an electric signal is applied to the set of tunable polarizers, thereby tuning the set of tunable polarizers, as discussed herein.

In 92, an event is detected, which is indicative of an intensity of light, as discussed herein.

In 93, the intensity of the light is reconstructed based on the detected event, as discussed herein.

It should be recognized that the embodiments describe methods with an exemplary ordering of method steps. The specific ordering of method steps is however given for illustrative purposes only and should not be construed as binding. For example, the ordering of 91 and 92 in the embodiment of FIG. 10 may be exchanged. Other changes of the ordering of method steps may be apparent to the skilled person.

Please note that the division of the control circuitry 86 into units 87 and 88 is only made for illustration purposes and that the present disclosure is not limited to any specific division of functions in specific units. For instance, the control circuitry 86 could be implemented by a respective programmed processor, field programmable gate array (FPGA) and the like.

A method for controlling an electronic device, such as a polarization imaging apparatus 80 discussed above, is described under reference of FIG. 10. The method can also be implemented as a computer program causing a computer and/or a processor, such as a control circuitry 86 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A polarization imaging portion comprising a plurality of imaging elements, wherein each imaging element is configured to convert light into an electric signal, the polarization imaging portion further comprising:
  a set of event sensors configured to detect an event being indicative of an intensity change of the light; and
  a set of polarization filters; and
  a set of tunable polarizers configured to adjust a polarization of the light in response to an electric signal, wherein
  each polarization filter of the set of polarization filters is associated with a respective tunable polarizer of the set of tunable polarizers, thereby configuring a set of tunable polarization filters, such that the set of tunable polarization filters is associated with the set of event sensors.

(2) The polarization imaging portion of (1), wherein the set of event sensors is associated with the set of imaging elements (3) The polarization imaging portion of anyone of (1) and (2), further comprising reconstruction circuitry configured to reconstruct the intensity of the light based on the detected event.

(4) The polarization imaging portion of (3), wherein the reconstruction circuitry is further configured to detect a change of a light intensity being indicated by a change of a number of consecutively detected events.

(5) The polarization imaging portion of anyone of (3) and (4), wherein the reconstructing is based on a coordinate transformation of a function being indicative of the light intensity.

(6) The polarization imaging portion of anyone of (1) to (5), further comprising tuning circuitry configured to tune the set of tunable polarizers by applying an electric signal to the set of tunable polarizers.

(7) The polarization imaging portion of anyone of (1) to (6), wherein the tuning circuitry is further configured to apply the electric signal for adjusting at least one first tunable polarizer of the set of tunable polarizers to have the polarization of the light differently from at least one second tunable polarizer of the set of tunable polarizers.

(8) The polarization imaging portion of anyone of (1) to (6), wherein the tuning circuitry is further configured to apply the electric signal for adjusting each tunable polarizer of the set of tunable polarizers to have the same polarization of the light.

(9) The polarization imaging portion of anyone of (1) to (8), wherein one tunable polarization filter is associated with one imaging element.

(10) The polarization imaging portion of anyone of (1) to (8), wherein one tunable polarization filter is associated with at least two imaging elements.

(11) The polarization imaging portion of anyone of (1) to (10), wherein the tunable polarizers of the set of tunable polarizers include a liquid crystal.

(12) The polarization imaging portion of anyone of (1) to (11), wherein the tunable polarizers of the set of polarization filters includes a static polarization filter.

(13) A method for polarization imaging for a polarization imaging portion comprising a plurality of imaging elements, wherein each imaging element is configured to convert light into an electric signal, the polarization imaging portion further comprising a set of event sensors configured to detect an event being indicative of an intensity change of the light; a set of polarization filters; and a set of tunable polarizers configured to adjust a polarization of the light in response to an electric signal, wherein each polarization filter of the set of polarization filters is associated with a respective tunable polarizer of the set of tunable polarizers, thereby configuring a set of tunable polarization filters, such that the set of tunable polarization filters is associated with a set of event sensors, the method comprising:
tuning the set of tunable polarizers by applying an electric signal to the set of tunable polarizers.

(14) The method of (13), further comprising:
applying the electric signal for adjusting at least one first tunable polarizer of the set of tunable polarizers to have the polarization of the light differently from at least one second tunable polarizer of the set of tunable polarizers.

(15) The method of (13), further comprising:
applying the electric signal for adjusting each of the set of tunable polarizers to have the same polarization of the light.

(16) The method of anyone of (13) to (15), further comprising:
detecting an event being indicative of an intensity of the light.

(17) The method of (16), further comprising:
reconstructing the intensity of the light based on the detected event.

(18) The method of anyone of (16) and (17), wherein a change of a light intensity is indicated by a change of a number of consecutively detected events.

(19) The method of anyone of (16) to (18), wherein the reconstructing is based on a coordinate transformation of a function being indicative of the light intensity.

(20) The method of (19), wherein the coordinate transformation is based on a partitioning of the light into a polarized part and an unpolarized part.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. A polarization imaging device, comprising:
a plurality of imaging elements;
a set of event sensors configured to
detect an electrical signal being generated in response to a photoelectric conversion in one or more of the plurality of imaging elements, and
detect an event being indicative of an intensity change of light by triggering the event when a change in light intensity exceeds a predetermined threshold;
a set of polarization filters; and
a set of tunable polarizers configured to adjust a polarization of the light in response to an electric signal;
wherein each polarization filter of the set of polarization filters is associated with a respective tunable polarizer of the set of tunable polarizers, thereby configuring a set of tunable polarization filters, such that the set of tunable polarization filters is associated with the set of event sensors, and
wherein the set of event sensors are configured to detect a sequence of positive and negative events indicating increases and decreases in light intensity over time relative to the predetermined threshold.

2. The polarization imaging device of claim 1, further comprising reconstruction circuitry configured to reconstruct the intensity of the light based on the detected event.

3. The polarization imaging device of claim 2, wherein the reconstruction circuitry is further configured to detect a change of a light intensity being indicated by a change of a number of consecutively detected events.

4. The polarization imaging device of claim 3, wherein the reconstructing is based on a coordinate transformation of a function being indicative of the light intensity.

5. The polarization imaging portion of claim 1, further comprising tuning circuitry configured to tune the set of tunable polarizers by applying an electric signal to the set of tunable polarizers.

6. The polarization imaging portion of claim 5, wherein the tuning circuitry is further configured to apply the electric signal for adjusting at least one first tunable polarizer of the set of tunable polarizers to have the polarization of the light differently from at least one second tunable polarizer of the set of tunable polarizers.

7. The polarization imaging portion of claim 5, wherein the tuning circuitry is further configured to apply the electric signal for adjusting each tunable polarizer of the set of tunable polarizers for having the same polarization of the light.

8. The polarization imaging portion of claim 1, wherein one tunable polarization filter is associated with one imaging element.

9. The polarization imaging portion of claim 1, wherein one tunable polarization filter is associated with at least two imaging elements.

10. The polarization imaging portion of claim 1, wherein the tunable polarizers of the set of tunable polarizers include a liquid crystal.

11. The polarization imaging portion of claim 1, wherein the polarization filters of the set of polarization filters include a static polarization filter.

\* \* \* \* \*